J. CHIDLEY.
LOOKOUT DEVICE FOR WINDOWS AND THE LIKE.
APPLICATION FILED DEC. 26, 1912.
1,102,320.
Patented July 7, 1914.
3 SHEETS—SHEET 3.
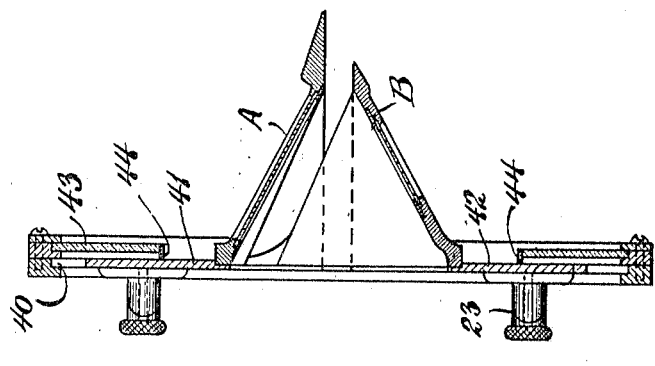
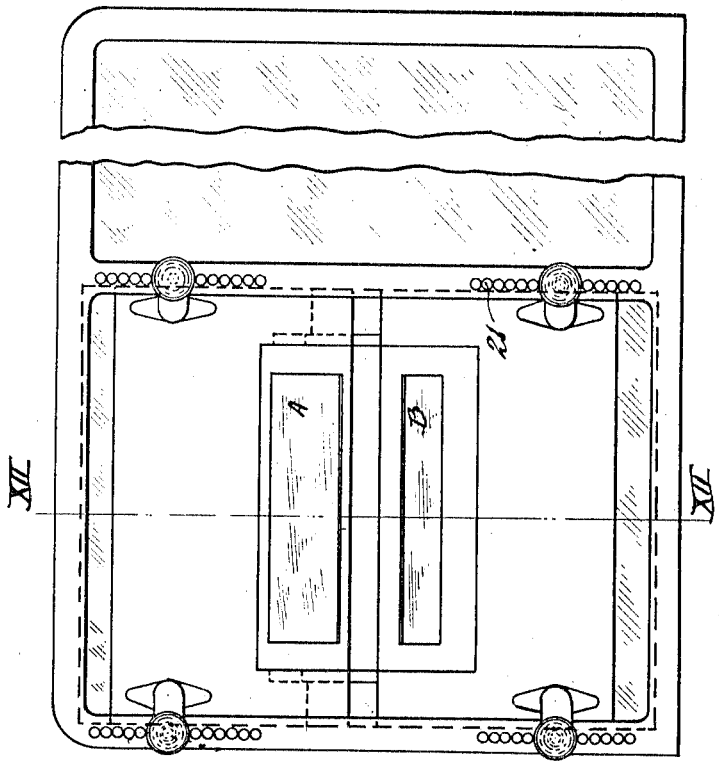

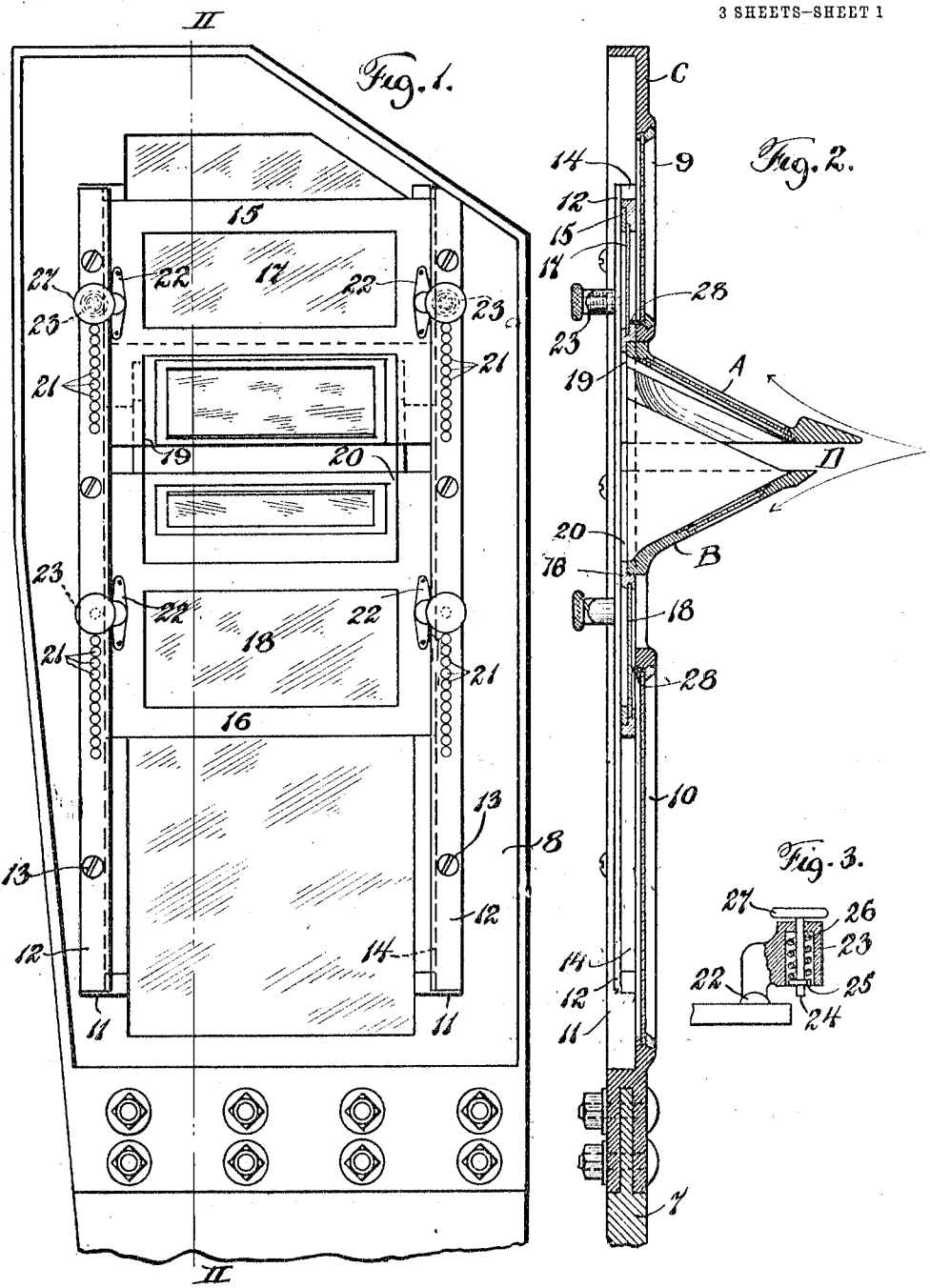

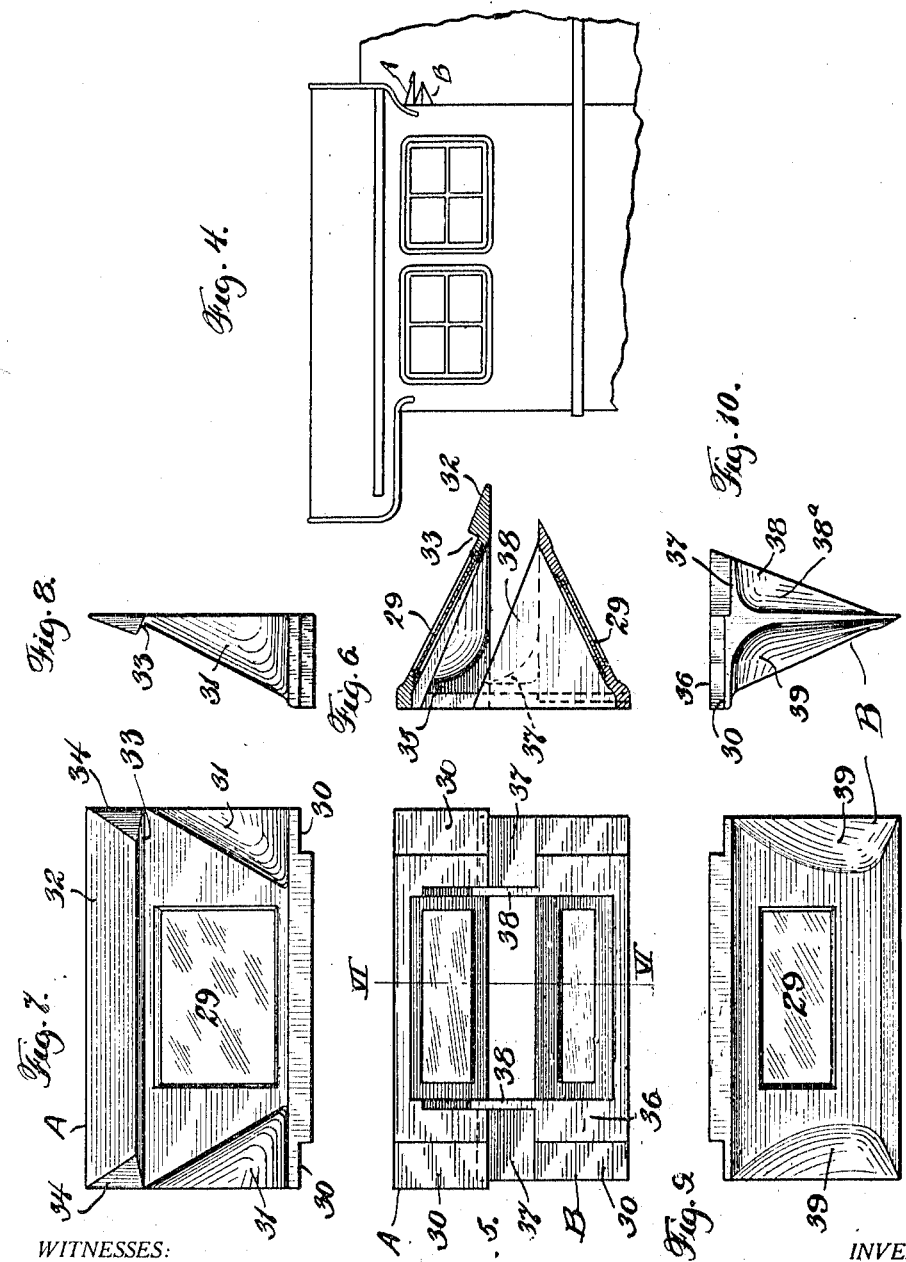

UNITED STATES PATENT OFFICE.

JOSEPH CHIDLEY, OF CLEVELAND, OHIO, ASSIGNOR TO LE GRAND PARISH OF NEW YORK, N. Y.

LOOKOUT DEVICE FOR WINDOWS AND THE LIKE.

1,102,320.

Specification of Letters Patent.

Patented July 7, 1914.

Application filed December 26, 1912. Serial No. 738,599.

*To all whom it may concern:*

Be it known that I, JOSEPH CHIDLEY, a citizen of the United States, residing at Cleveland, in the county of Cuyahoga and State of Ohio, have invented certain new and useful Improvements in Lookout Devices for Windows and the like, of which the following is a specification.

This invention relates to lookout devices for locomotive and street car cabs, automobiles and other vehicles, and it contemplates the provision of a device which affords a clear field of vision regardless of severe weather conditions in seasons of cold, snow or rain. Other objects of the invention reside in the provision of means whereby the lookout window may be readily adjusted not only as to range of vision afforded but also as to elevation for purposes of convenience. My invention also contemplates the provision of a lookout device which presents an unobstructed sight opening but which is so arranged that rain or snow cannot enter the opening but is carried to one side. The currents of air are also deflected so that only a negligible quantity works through the sight opening, thereby rendering the device particularly serviceable in cold weather. These, together with such other objects as may hereinafter appear or are incident to my invention I attain by means of a construction illustrated in preferred form in the accompanying drawings, wherein:—

Figure 1 is an elevation of a portion of a locomotive cab door, looking from the inside of the cab, to which my improved lookout window is applied; Fig. 2 is a section of the device of Figure 1 on the line II—II thereof; Fig. 3 is a section of a detail of my invention; Fig. 4 is a diagrammatic showing of a locomotive cab and illustrates the relative position of the lookout device; Fig. 5 is a rear elevation of the device removed from the cab; Fig. 6 is a section taken on the line VI—VI of Fig. 5; Figs. 7 and 8 are respectively a plan and end elevation of the upper member of the lookout; Figs. 9 and 10 are respectively a bottom plan and end elevation of the lower member of the lookout; Fig. 11 is an elevation of a wind-shield of an automobile and illustrates the application of my improved lookout; and Fig. 12 is a section taken on the line XII—XII of Fig. 2.

Briefly stated, the outlook device comprises a pair of members spaced apart to provide an unobstructed sight opening, the said members having deflecting surfaces so arranged as to deflect the air impinging on the members, thereby creating currents which draw off and carry along the air which is in the plane of the sight opening and which normally would find its way therethrough. It will be clear that rain or snow will also be carried aside and will not work its way into the cab through the sight opening.

Referring to Figs. 1 to 10 inclusive, it will be seen that the device comprises a pair of what may be termed hoods A and B which project forwardly of the cab door C and are spaced apart so as to afford an unobstructed sight opening D, the range of vision afforded being sufficient to take in the tracks and signal apparatus. The hoods are of angular shape and when assembled closely resemble a V-shaped hollow wedge having an aperture extending from the base through the apex, the base of the wedge being adjacent to the window.

The door C comprises the usual wooden framework 7 to which is bolted a metal frame 8 provided with two main openings 9 and 10 adapted to receive window panes. On the back of the door, extending vertically on each side of the main window openings is a boss or rib 11. Plates 12 are fastened to the ribs by means of screw studs 13, the plates overlapping the inner edges of the ribs so as to provide grooves or guideways 14 (see Figs. 1 and 2). Slidably mounted in the guideways are a pair of supplemental window frames 15 and 16 which are also provided with window panes 17 and 18. The adjacent ends of the frames have cut-out portions 19 and 20 of a rectangular shape to correspond with the configuration of the base portions of the hoods A and B, which are respectively mounted in the frames 15 and 16 in such manner that the interior edges of the base portions are in substantial alinement with the inner edges of the cut-out portions 19 and 20. The hoods may be secured to the frames in any desired manner.

The gap or sight opening between the hoods is adjusted to regulate the field of vision by separating the frames 15 and 16, or by advancing them toward each other. I provide for this adjustment by drilling a plurality of holes 21 in each plate 12, the holes being arranged in corresponding sets. Each frame is provided with a pair of brackets 22 provided with cylindrical portions 23 in which are mounted pins 24 having shoulder portions 25. The ends of the pins are adapted to engage the holes 21 in the plates 12 and are normally held in engagement by the compression springs 26 which are mounted in the cylinders and are adapted to bear against the shoulders 25 (see Fig. 3). The inner ends of the pins are provided with buttons 27, and when it is desired to adjust the frames 15 and 16, the pins are pulled out of engagement with the plates 12 and then slipped into other holes either above or below the previous point of engagement as may be desired. This construction also permits of adjusting the lookout device bodily so that it may be varied in elevation to suit the convenience of various users.

It will be noted that the windows 17 and 18 overlap the main windows 9 and 10 and in order to provide a means for keeping the outer face of the windows 17 and 18 clean, I mount wiper strips 28 on the inside of the windows 9 and 10 at the lower and upper edges respectively in such manner as to bear against the outer surface of the windows 17 and 18. By raising and lowering the latter, the glass is cleaned. The strips serve the additional function of preventing entrance of air and of preventing water from seeping into the cab between the window frames.

The relative location of the lookout in the cab is illustrated in Fig. 4, which is a partial side elevation of a locomotive cab.

Referring now to Figs. 5 to 10 inclusive the specific construction of the hoods will now be described.

Each hood constitutes in effect a frame, the main surface of which extends at an acute angle, the ends of the frame being closed in so that when the frame is viewed from the side it presents an outline substantially that of a 60° right-angled triangle, the base of which is adjacent to the window. In the drawings I have shown the frames provided with small glass windows 29 to extend the field of vision beyond that afforded by the sight opening, this being of use in favorable weather conditions. It will be obvious that any other transparent substance can be used in place of the glass. The base of the frames is cut out intermediate the ends and is also under-cut adjacent to each end at 30 so as to fit the window frame in which the base is mounted. The closed ends of the hood A slope inwardly and upwardly in a curved surface from the lower edge to the upper surface and base as indicated at 31—Figs. 7 and 8. The nose 32 or front edge of the hood A is provided with a groove 33 to carry off any water deposited on the top surface of the hood to the sides. The ends of the nose slope downwardly to the edges of the frame as at 34. Recesses 35 are provided in the hood A adjacent to the ends thereof between the base and the main portion of the frame.

The base 36 of the hood B extends upwardly in the form of flanges 37 which are undercut so as to dove-tail into the recesses 35 when the two hoods are in proper relative position. The hood B is also provided with flanges 38 which extend from the base forwardly to the front edge of the frame. The flanges 38 slope downwardly to the edges of the frame in a curved surface 38$^a$ complementary to the cut-out portions 31 of the hood A, so that the two hoods may dove-tail. These flanges prevent any water that may work past the side edges of the hood from entering the cab. The exposed ends of the hood B are also sloped at 39 in substantially the same manner as are those of the hood A at 31. The frame of the hood A is larger than that of the hood B so that any water dripping therefrom will fall clear of the latter.

In service the inclined main surfaces of the hoods will cause two diverging currents to flow one on either side of the device somewhat in the manner indicated by the arrows in Fig. 2. These currents will draw and carry along the air which is in the plane of the sight opening and rain or snow will be carried along therewith. Practically no air passes through the sight opening because of the tendency of the currents to create an outward suction at the edges of the device. The inclined curved surfaces at 31 and 39 accomplish the same result at the sides of the device.

From the foregoing it will be clear that the invention briefly stated consists in providing a pair of diverging planes, spaced apart to provide a sight opening, and so arranged as to cause a current or currents of air preventing a flow through the sight opening. The advantages of the invention in rainy or snowy weather and at times when the glass of the windows becomes frosted will be apparent.

In Figs. 11 and 12 I have illustrated one form in which the invention may be applied to an automobile wind shield.

In this form, the frame of the shield is provided with grooves 40 in which are mounted frames 41 and 42 which carry the hoods in the manner described. The glass 43 of the shield is cut away to accommodate the hoods and is provided with strips 44 for the purposes hereinbefore specified. The device performs the same function as when applied to a cab, and if desired, may be extended entirely across the shield.

Having thus described my invention and illustrated its use, what I claim as new and desire to secure by Letters Patent is the following:

1. A loookout device for windows and the like comprising a pair of co-acting planes arranged one above another and spaced apart and converging toward one another in a direction from the window forward and means whereby the relative vertical position of the planes with respect to each other can be varied.

2. A lookout device for windows and the like comprising a pair of co-acting planes placed one above the other and spaced apart and converging toward one another in a direction from the window forward, a mounting therefor, and means whereby the vertical position of the planes with respect to each other on the mounting may be varied.

3. A lookout device for windows and the like comprising a pair of co-acting planes arranged one above the other and spaced apart and converging toward one another in a direction from the window forward, a mounting therefor, and a common means whereby the relative vertical position of the planes with respect to each other and with respect to the support may be varied.

4. A lookout device for windows and the like comprising a pair of hoods spaced apart to provide a sight opening, all exposed surfaces of the upper hood diverging upwardly from a horizontal plane in a direction substantially from the front to the rear, and all exposed surfaces on the lower hood diverging downwardly from horizontal.

5. A lookout device for windows and the like comprising a pair of hoods spaced apart to provide a sight opening, the upper and the lower surface of the upper and lower hoods respectively inclining upwardly and downwardly from the horizontal from the front to the rear, and the surfaces at the sides of the hoods inclining inwardly from the vertical toward the central portion of the hoods.

6. A lookout device for windows and the like comprising a pair of diverging planes, one above the other and spaced apart to provide a sight opening, the upper plane having larger dimensions than the lower plane, and means for discharging at the sides of the upper plane moisture deposited on the said plane.

7. A lookout device for windows and the like comprising a pair of diverging planes, one above the other and spaced apart to provide a sight opening, the upper plane having larger dimensions than the lower plane, and a channel on the upper plane adapted to carry moisture deposited on said plane to the sides thereof.

8. A lookout device for windows and the like comprising a pair of diverging hoods spaced apart to provide a sight opening, and upstanding means on the lower hood adapted to prevent snow, rain and other bodies from entering the sight opening from the sides.

9. A lookout device for windows and the like comprising a pair of diverging hoods spaced apart to provide a sight opening, the said hoods having telescoping parts adjacent the sides thereof whereby snow, rain or other bodies are prevented from entering the sight opening at the sides.

10. A lookout device for windows and the like comprising a pair of diverging hoods spaced apart to provide a sight opening, and means for preventing snow, rain or other bodies from entering the sight opening at the sides of the hoods.

11. A lookout device for windows and the like comprising a pair of hoods spaced apart to provide a sight opening, the top surface of the upper hood inclining upwardly from the horizontal from the front to the rear, and the surfaces at the sides of the upper hood inclining upwardly and inwardly toward the central portions of said hood.

12. A lookout device for windows and the like comprising a pair of hoods spaced apart to provide a sight opening, the bottom surface of the lower hood inclining downwardly from the horizontal from the front to the rear, and the surfaces at the sides of the lower hood inclining downwardly and inwardly toward the central portions of the hood.

13. A lookout device for windows and the like comprising a hood, a slidable frame, a second hood co-acting with the first hood carried on the slidable frame, and means for locking the frame in any desired position, the second hood being advanced toward or retracted from the first hood by movement of the frame.

14. A lookout device for windows and the like comprising a pair of slidable frames arranged in substantially the same plane, a hood carried by each frame projecting forwardly of the window, and means for locking either of the frames in any desired relative position.

15. The combination with a cab window and the like having a suitable frame, of a pair of supplemental frames slidably mounted in the window frame, a hood carried on each supplemental frame projecting forwardly of the window, a plurality of positioning means on the window frame, and means on the supplemental frames releasably engaging said positioning means.

In testimony whereof I have hereunto signed my name in the presence of the two subscribed witnesses.

JOSEPH CHIDLEY.

Witnesses:
M. D. FRANEY,
CHAS. R. ELY.